I. B. TANNER.
FILTERING APPARATUS.
APPLICATION FILED APR. 9, 1919.

1,398,285.

Patented Nov. 29, 1921.

Inventor:
Inos B. Tanner

UNITED STATES PATENT OFFICE.

INOS B. TANNER, OF CHICAGO, ILLINOIS, ASSIGNOR TO JOSEPH E. NELSON & SONS, A FIRM COMPOSED OF JOSEPH E. NELSON, JOHN E. NELSON, AND WILLIAM H. NELSON, OF CHICAGO, ILLINOIS.

FILTERING APPARATUS.

1,398,285.          Specification of Letters Patent.      Patented Nov. 29, 1921.

Application filed April 9, 1919. Serial No. 288,770.

*To all whom it may concern:*

Be it known that I, INOS B. TANNER, citizen of the United States, residing at Chicago, in the county of Cook and State of Illinois, have invented a certain new and useful Improvement in Filtering Apparatus, of which the following is a full, clear, concise, and exact description.

My invention relates to tanks equipped with filtering apparatus for effecting separation between liquid admitted to the tanks and the substances that are to be separated from the liquid.

The apparatus of my invention is of particular service where it is employed for separating matter held in suspense in water, the apparatus of my invention enabling such rapid separation of the solid matter from the water that the filtered or clarified water may be rapidly supplied from the tank. The tanks of my invention are of particular service when employed upon railroads for the purpose of supplying locomotives with water.

In the preferred way of practising my invention there is employed a sediment or sludge basin, a stand pipe rising therefrom and having its lower end surrounded thereby, filtering material filling in the space between the stand pipe and the rim of the basin, piping for admitting water to be filtered to the stand pipe, piping for enabling the flow of filtered water, and a valved opening in the bottom of the basin to enable the discharge of the sludge or sediment therefrom. An arrangement such as this not only enables the rapid separation of the sediment from the water, but also keeps or tends to keep the filtering material clean in the filtering operation.

The flow of water through the filtering material may readily be reversed to effect the discharge of the sediment and the further removal of sediment from the filtering material and the washing of such material.

Figure 1:
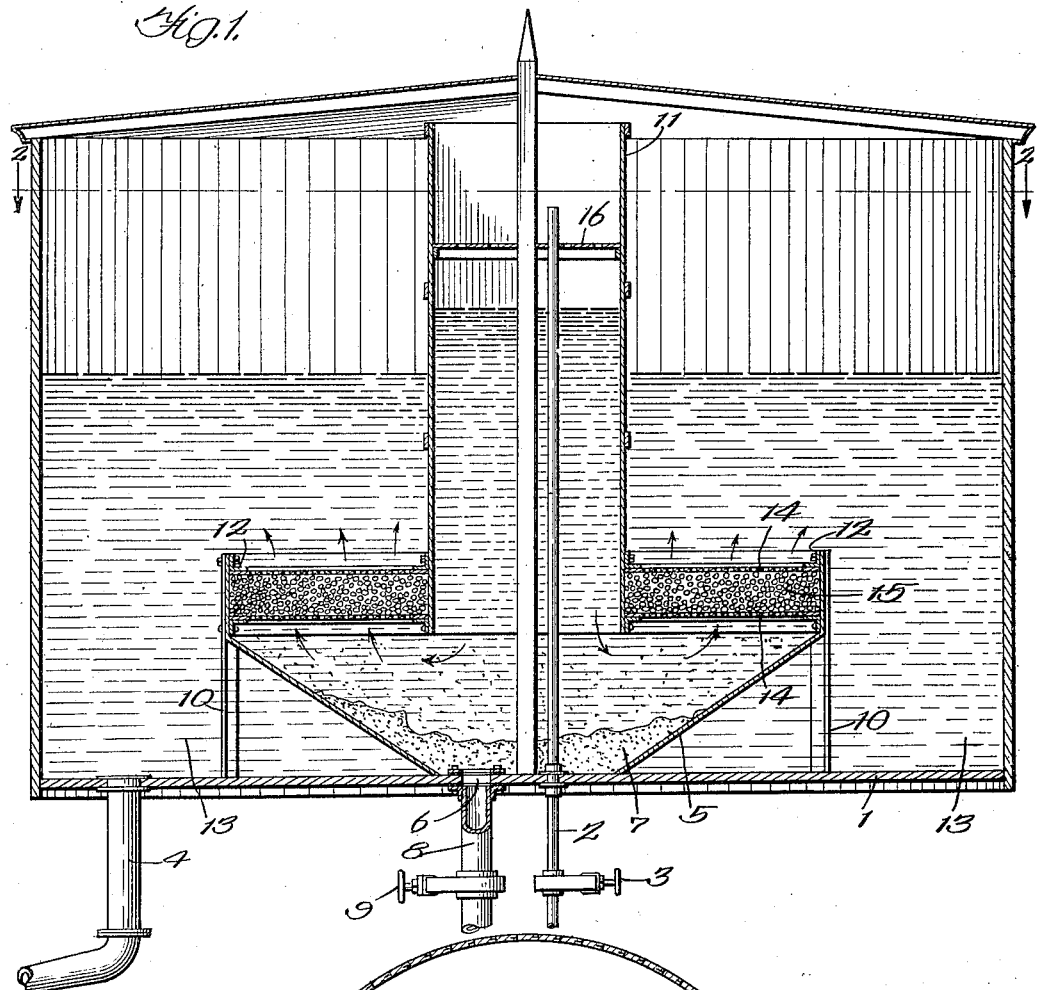
Figure 2:
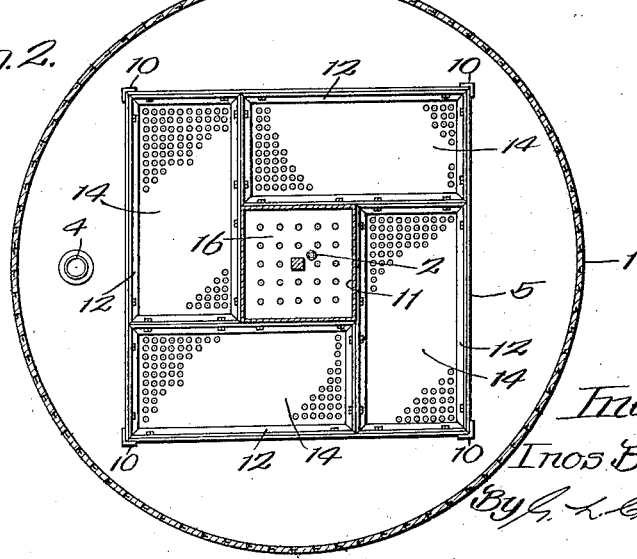

I will explain my invention more fully by reference to the accompanying drawing showing the preferred embodiment thereof and in which Figure 1 is a view in sectional elevation of a filtration tank constructed in accordance with the preferred embodiment of my invention; Fig. 2 is a sectional view on line 2—2 of Fig. 1, but on a smaller scale.

Like parts are indicated by similar characters of reference in both figures.

The form of the invention herein shown is one which is adapted particularly for the filtering of water which is to be supplied to locomotives but the invention is not to be limited to this purpose nor to the nature of the liquid filtered thereby.

In the particular embodiment of the invention illustrated the filtering portion of the structure is such that it may readily be assembled within previously installed wooden tanks, though it is understood, of course, that the nature of the tank and the material of which it is formed may be varied without departing from the spirit of the invention.

The tank 1 illustrated has its bottom perforated for the passage therethrough of a riser or pipe 2, terminating with its upper end near the top of the tank, where water to be filtered is admitted to the tank when the cutoff valve 3 is opened. An outlet pipe 4, opened and closed by suitable valving mechanism not shown, also preferably passes through the bottom of the tank and terminates at its upper end near the tank bottom. A conical or downwardly tapering sediment basin 5 has for its bottom a portion of the tank bottom which is perforated at 6 for the outflow of sediment or sludge 7. The opening 6 is desirably at the upper end of a pipe 8 having a normally closed valve 9 for opening and closing said pipe. The basin is desirably rectangular or polygonal in contour and has coupled therewith at its corners the upright angle iron legs 10 which serve to position the basin and support it level upon the bottom of the tank. A stand pipe 11, preferably rectangular or polygonal in cross section, rises from the middle of the basin, the lower end of the stand pipe being in the zone of the basin rim. A pair of rectangular or polygonal frames 12, one above the other, are desirably bolted to each side of the stand pipe, and to the sides of the rectangular or polygonal rim of the basin 5 being of a size to fill the rectangular space defined by the plane of this side of the stand pipe and the plane of an adjacent side of the stand pipe, in conjunction with the walls of the basin rim in planes parallel to the aforesaid planes. These pairs of frames 12 are arranged in succession around the stand pipe, one short side of each frame of each pair being bolted to the longer sides of the adjacent two frames that project laterally of the stand pipe. The frames, arranged in succession around the stand pipe and being bolted to the stand pipe, to each other, and to the rectangular rim of the basin, secure firm assembly between the basin rim and the stand pipe and enable the elevation of the lower end of the stand pipe sufficiently above the bottom of the basin to permit of the proper flow of water through the filtering apparatus into the portion 13 of the tank surrounding such apparatus.

The frames 12 of each pair are provided each with a perforated plate 14. The plates 14 of each pair are spaced apart to receive filtering material 15 therebetween such as carbon or gravel, or any other preferred filtering medium. There is thus provided a filtering chamber surrounding the stand pipe and surrounded by the rim of the sediment basin, the inner wall of this chamber being formed by the lower portion of the stand pipe, the outer wall of this chamber being formed by the rim of the basin, and the top and bottom walls of the chamber by the upper and lower perforated plates 14.

The upper end of the inlet riser 2 is sufficiently below the upper end of the stand pipe 11 to prevent water from being discharged directly into the portion 13 of the tank which is to be occupied only by the filtered water. The perforated diaphragm 16 is located in the stand pipe 11 a suitable distance below the upper end of the pipe 2, the purpose of this diaphragm or partition being to spread the water as it falls in the stand pipe so that there will be no definite current of down flowing water through the stand pipe. By this arrangement the water flowing downwardly through the stand pipe will be evenly distributed in its flow from the bottom of the stand pipe toward the rim of the basin and the filtering chamber that is between the basin rim and the stand pipe. When the valve 3 is opened water will flow through the riser 2 on to the perforated partition 16 which will spread the water as it flows downwardly through the stand pipe. The water will flow from the bottom of the stand pipe through the filtering material which so retards the upward flow of the water through it as to enable the water to be accumulated in the stand pipe at a higher level than the water in the tank portion 13 surrounding the stand pipe. There is thus afforded in the stand pipe a "head" of water to create a gravity pressure that will force the flow of the water through the stand pipe downwardly and through the filtering material upwardly. Solid matter will be precipitated from the body of water in the stand pipe and also from the water as it flows from the stand pipe to the filtering chamber, this solid matter being accumulated in the bottom of the basin in the form of sludge as indicated at 7.

Some of the lighter particles of solid matter will be carried by the water in its flow from the stand pipe to the filtering chamber but will be intercepted by the lower plates 14 and the filtering material 15. Solid matter accumulated upon the bottom surfaces of the bottom plates 14 will drop off and fall to the bottom of the basin or will be washed off by the flowing water. When sufficient water has been admitted to the tank through the pipe 2, the valve 3 is closed, whereafter the level of the water in the stand pipe and the level of the water in the portion 13 surrounding the stand pipe will become co-incident.

When the filtered water is drawn through the pipe 4 the level of the water in the portion 13 of the tank will become lowered with respect to the level of the water in the stand pipe so that the filtering operation will be resumed even without the admission of fresh water through the pipe 2, the renewal of the filtering operation being due to the fact that the filtering material 15 will retard the descent of the water in the stand pipe to enable the formation of a head of water in the stand pipe with respect to the water surrounding the stand pipe.

When the sludge 7 is to be removed the valve 9 is opened and the valve 3 is preferably closed. Water from the stand pipe will flow directly down to the pipe 8 carrying with it sludge from the bottom of the basin. Previously filtered water will also flow backwardly through the filtering material 15 into the basin 5 also to effect the removal of the sludge and serving, in its backward flow, to clean the filtering material and the plates 14 of the lighter solid matter carried thereto in the previous filtering operation. When the sludge 7 has been sufficiently removed and the washing process has been concluded the valve 9 is placed in its normally closed position and the valve 3 is opened to admit a fresh supply of water that is to be filtered to the stand pipe 11 from which the water flows through the filtering material 15 into the portion 13 surrounding the stand pipe to filter the water in the manner previously described, the valve 3 being closed when filtered water in the tank portion 13 has been accumulated in such tank portion to a sufficient or normal extent.

It is to be understood that the invention is not to be limited to the employment of a riser 2 as the source from which water is supplied to the stand pipe, nor is the invention to be limited to other precise details of construction and arrangement illustrated as changes may readily be made without departing from the spirit of my invention, but having thus described my invention I claim as new and desire to secure by Letters Patent the following:

1. Filtering apparatus including a stand pipe that is rectangular in cross section; a basin whose bottom is below and spaced apart from the lower end of the stand pipe, said basin having a rectangular rim; rectangular frames coupling the sides of the stand pipe with the sides of the basin rim; and filtering material at said frames.

2. Filtering apparatus including a stand pipe that is polygonal in cross section; a basin whose bottom is below and spaced apart from the lower end of the stand pipe, said basin having a polygonal rim; polygonal frames coupling the sides of the stand pipe with the sides of the basin rim; and filtering material at said frames.

3. Filtering apparatus including a stand pipe that is rectangular in cross section; a basin whose bottom is below and spaced apart from the lower end of the stand pipe, said basin having a rectangular rim; a pair of spaced apart rectangular frames coupling each side of the stand pipe with a side of the basin rim; and filtering material between said frames.

4. Filtering apparatus including a stand pipe that is polygonal in cross section; a basin whose bottom is below and spaced apart from the lower end of the stand pipe, said basin having a polygonal rim; a pair of spaced apart polygonal frames coupling each side of the stand pipe with a side of the basin rim; and filtering material between said frames.

5. Filtering apparatus including a stand pipe that is rectangular in cross section; a basin whose bottom is below and spaced apart from the lower end of the stand pipe, said basin having a rectangular rim; a pair of spaced apart rectangular frames coupling each side of the stand pipe with a side of the basin rim; perforated plates at said frames; and filtering material between said plates.

6. Filtering apparatus including a stand pipe that is polygonal in cross section; a basin whose bottom is below and spaced apart from the lower end of the stand pipe, said basin having a polygonal rim; a pair of spaced apart polygonal frames coupling each side of the stand pipe with a side of the basin rim; perforated plates at said frames; and filtering material between said plates.

In witness whereof I hereunto subscribe my name this 31st day of March, A. D., 1919.

INOS B. TANNER.